US005107717A

United States Patent [19]

Jackerson

[11] Patent Number: 5,107,717

[45] Date of Patent: Apr. 28, 1992

[54] CAMMING APPARATUS FOR A ROTARY SPRINKLER

[76] Inventor: Shalom Jackerson, 60/6 Bnei Or Street, Beer Sheva, Israel

[21] Appl. No.: 597,414

[22] Filed: Oct. 11, 1990

Related U.S. Application Data

[63] Continuation of Ser. No. 527,716, May 23, 1990, which is a continuation of Ser. No. 271,300, Nov. 15, 1988.

[30] Foreign Application Priority Data

Nov. 19, 1987 [IL] Israel ........................................ 84542

[51] Int. Cl.[5] ........................ F16H 27/00; F16H 31/00

[52] U.S. Cl. ........................................ 74/129; 74/160; 239/239

[58] Field of Search ......................... 74/128, 129, 160; 239/263.3

[56] References Cited

U.S. PATENT DOCUMENTS

| | | | |
|---|---|---|---|
| 2,346,352 | 4/1944 | Boxell | 74/128 X |
| 2,923,206 | 2/1960 | Kovac | 74/128 X |
| 4,509,686 | 4/1985 | Larsen | 239/239 |
| 4,727,763 | 3/1988 | Georget | 74/129 |
| 4,771,646 | 9/1988 | Ruggier et al. | 74/129 |

*Primary Examiner*—Allan D. Herrmann
*Assistant Examiner*—David W. Laub
*Attorney, Agent, or Firm*—Mason, Fenwick & Lawrence

[57] ABSTRACT

A rotary sprinkler including a stationary cylinder, one end of which is connectable to a water supply line, a central rod rotatably mounted inside the cylinder, having at least one supply duct passing therethrough and directly leading to a sprinkler head attachable to the upper end of the rod, as well as a plurality of separate control ducts inside, and ports communicating with the ducts and leading to the outer surface of, the rod, at least one port communicating with the supply duct. The sprinkler further comprises a piston riding on the central rod and slidable in the cylinder between an upper and a lower position, the piston dividing the cylinder into an upper chamber and a lower chamber, coupling means being provided for linking the central rod to the piston in rotation while permitting the piston one degree of freedom of stroke-like, reciprocating translatory movement relative to the central rod, a valve member located on the central rod for controlling at least some of the ports to the effect of producing the reciprocating, translatory movement, and at least one set of camming means kinematically linking the stationary cylinder and the slidable, piston.

11 Claims, 8 Drawing Sheets

CAMMING APPARATUS FOR A ROTARY SPRINKLER

This application is a continuation of application Ser. No. 07/527,716 filed May 23, 1990, which is a continuation of application Ser. No. 271,300 filed Nov. 15, 1988.

BACKGROUND OF THE INVENTION

The present invention relates to a cammings apparatus for a rotary sprinkler of the type used to irrigate lawns, gardens, vegetable fields and other crops.

Various types of such sprinklers are known and, according to the mechanics of their drives, can be subdivided into three types:

1. Sprinklers operated by the velocity pressure of a jet impacting a member that advances the nozzle of the sprinkler by an angular step;

2. Sprinklers in which velocity pressure of the incoming water is used to drive a kind of a turbine which, via a step-down transmission, drives the sprinkler nozzle in continuous rotary motion;

3. Sprinklers in which the reaction produced by a jet emitted from a tube in a nozzle is converted into a torque which causes the tube to rotate about a vertical axis.

In sprinklers of group 1 the torque produced by the impacting jet is very limited and even minor soiling of either the nozzle or the bearing is liable to stop rotation altogether.

With sprinklers of group 2, the torque acting on the nozzle is quite sufficient—as long as the turbine works, since a gear transmission mission is interposed. The torque acting on the turbine itself is, however, rather small and the slightest fouling is likely to stop the turbine from rotating.

Sprinklers of type 3 tend to rotate at excessive speeds unless effectively braked. Braking, that is, annihiliating part of the kinetic energy of the flowing water is, however, a wasteful and irrational practice.

It is one of the objects of the present invention to overcome the disadvantages of prior-art sprinklers and to provide a sprinkler that operates not on velocity pressure of the water but on the static pressure thereof, therefore producing a torque sufficiently high to ensure proper rotation also under unfavourable field conditions and not using up velocity pressure at the expense of throw, and that, in one of its embodiments, can also be used in what is known as "adjustable angular sweep" mode, in which the sprinkler sweeps out not a full circle, but a sector of a presettable angle smaller than 360°.

SUMMARY OF THE INVENTION

According to the invention, this is achieved by providing a rotary sprinkler comprising a stationary cylinder, one end of which is connectable to a water supply line; a central rod rotatably mounted inside said cylinder, having at least one supply duct passing therethrough and directly leading to a sprinkler head attachable to the upper end of said rod, as well as a plurality of separate control ducts inside, and ports communicating with said ducts and leading to the outer surface of, said rod, at least one port communicating with said supply duct; a piston riding on said central rod and slidable in said cylinder between an upper and a lower position, said piston dividing said cylinder into an upper chamber and a lower chamber, coupling means being provided for linking said central rod to said piston in rotation while permitting said piston one degree of freedom of stroke-like, reciprocating translatory movement relative to said central rod; a valve member located on said central rod for controlling at least some of said ports to the effect of producing said reciprocating, translatory movement, and at least one set of camming means kinematically linking said stationary cylinder and said slidable piston, whereby at least part of said translatory, reciprocating strokes of said piston will produce the superposition thereupon of a stepwise, angular movement in at least one sense of rotation transmitted, via said coupling means, to said central rod and said nozzle-carrying head piece.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

BRIEF DESCRIPTION OF THE DRAWINGS

In the drawings:

FIG. 20 is a bottom view of the arm of FIG. 21;

Figure 1:
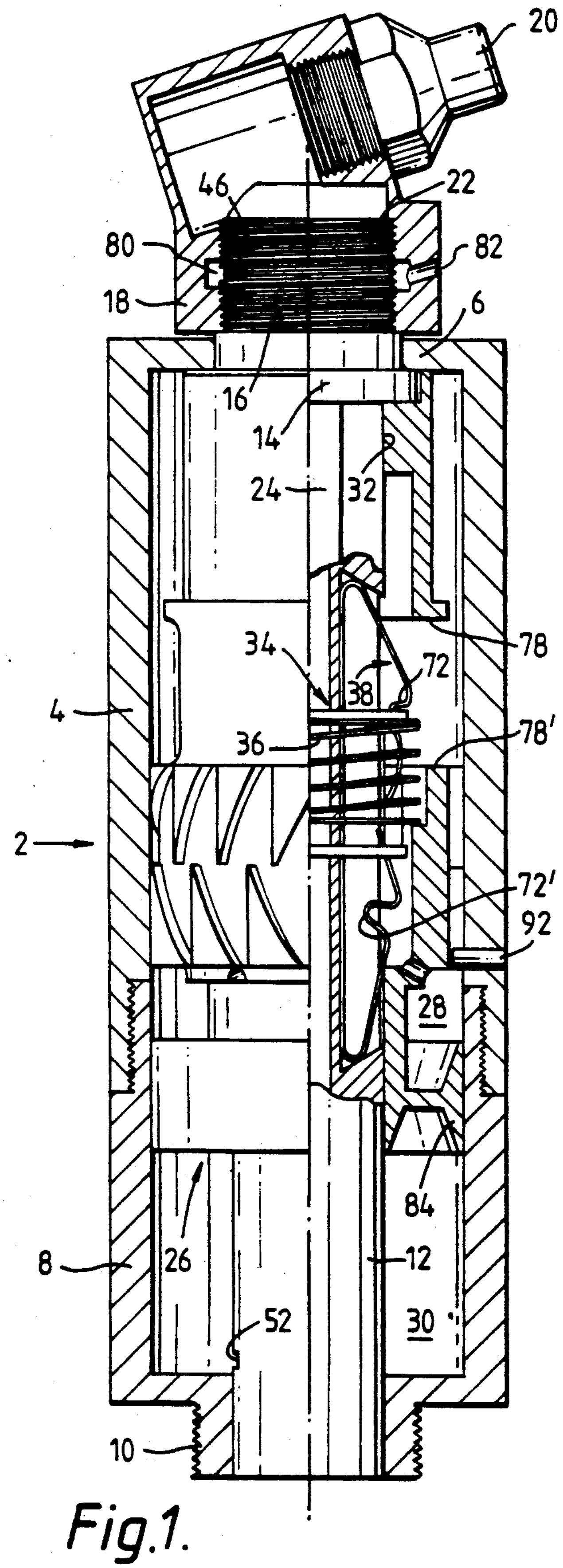
FIG. 1 is a view, in partial cross section, of a first embodiment of the rotary sprinkler according to the invention.
Figure 2:
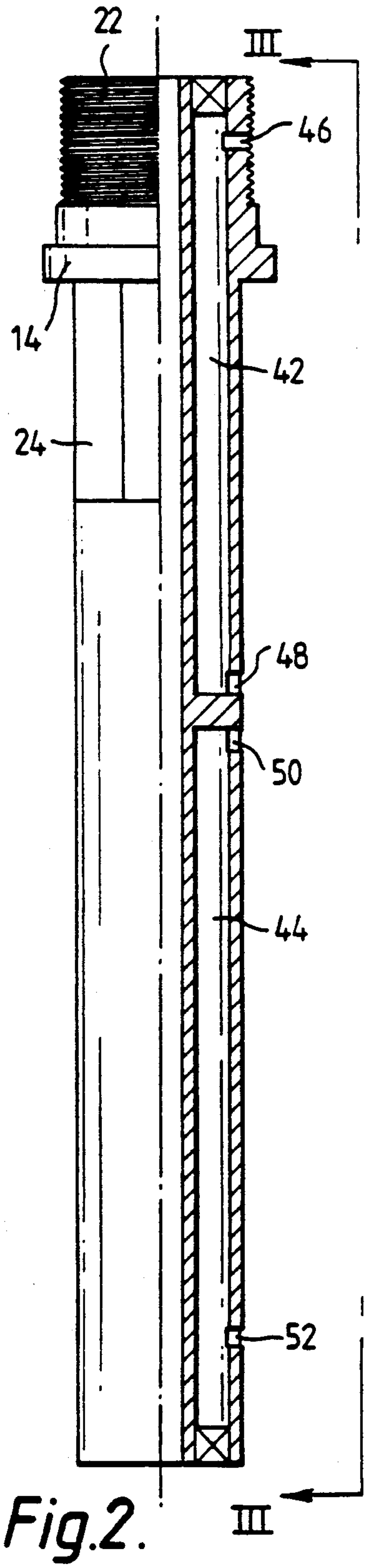
FIG. 2 is a view, in partial cross section along plane II—II in FIG. 7, of the central rod of the sprinkler.
Figure 3:
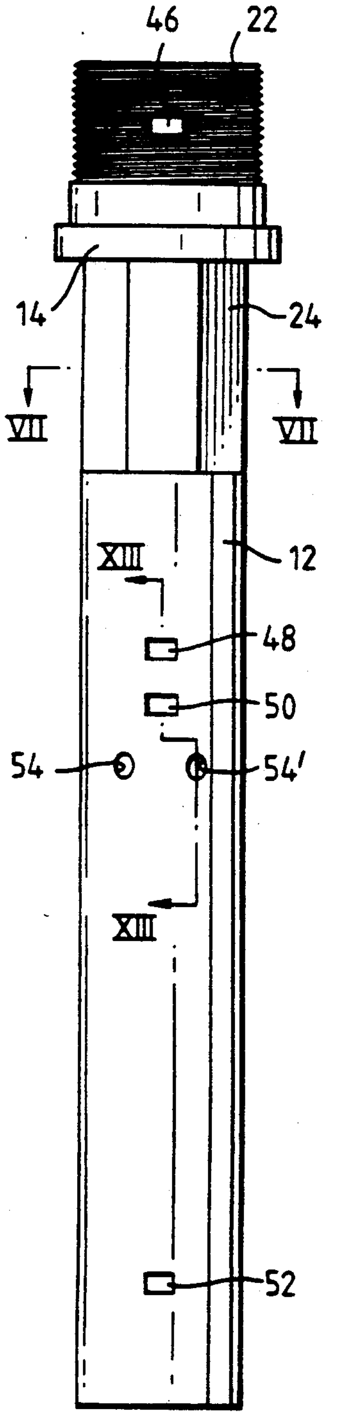
FIG. 3 represents a view, in direction of arrow III—III of FIG. 2, of the central rod.
Figure 4:
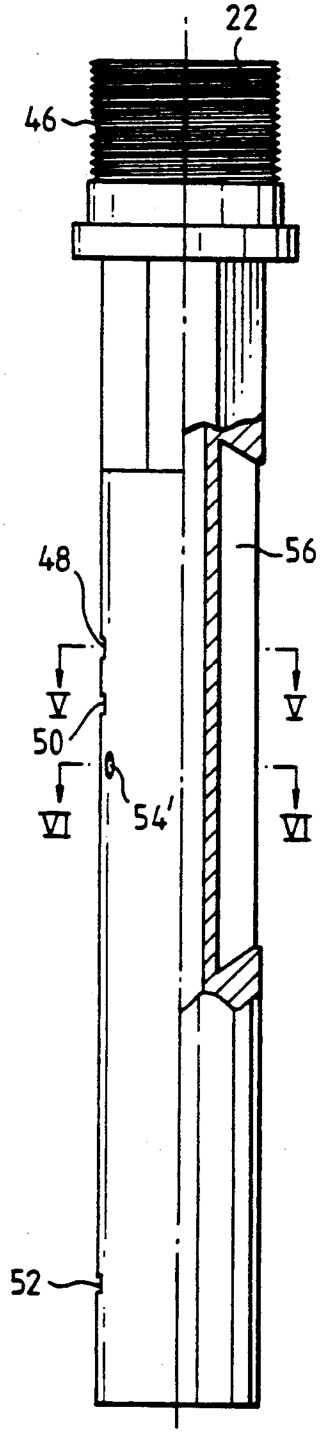
FIG. 4 is a view, in partial cross section along plane IV—IV of FIG. 7 of the rod.
Figure 5:
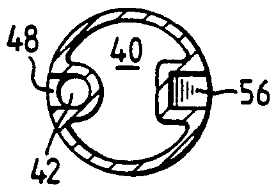
FIG. 5 shows the rod in cross section along plane V—V of FIG. 4.
Figure 6:
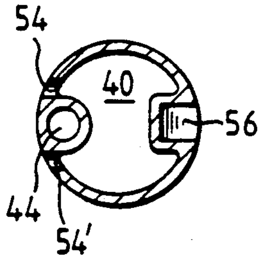
FIG. 6 is a similar view, in cross section along plane VI—VI of FIG. 4.
Figure 7:
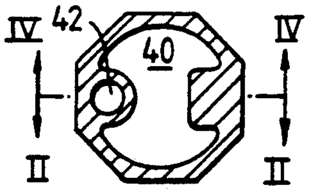
FIG. 7 is a similar view, in cross section along plane VII—VII of FIG. 3.
Figure 8:
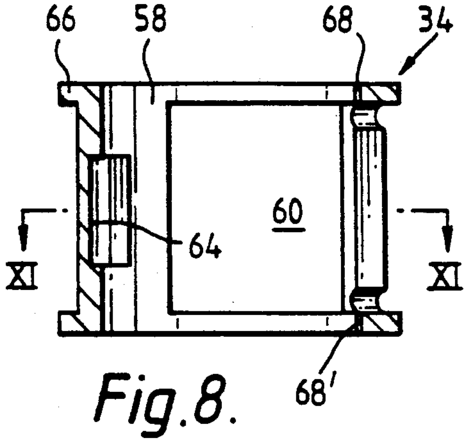
FIG. 8 is a cross-sectional view of the sliding valve of the sprinkler.
Figure 9:
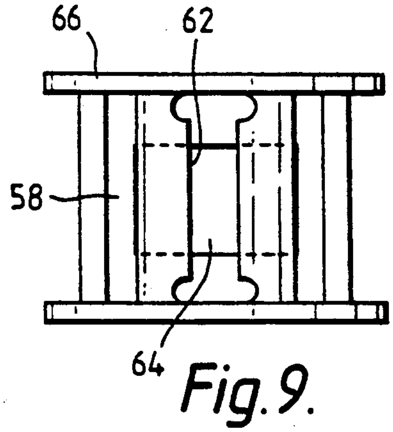
FIG. 9 is a top view of the sliding valve.
Figure 10:
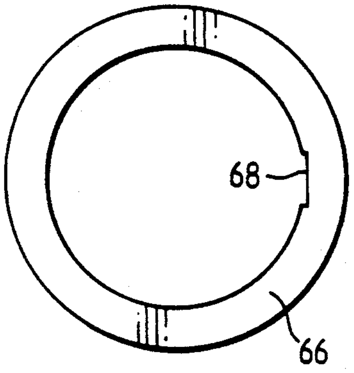
FIG. 10 represents a side view of the valve.
Figure 11:
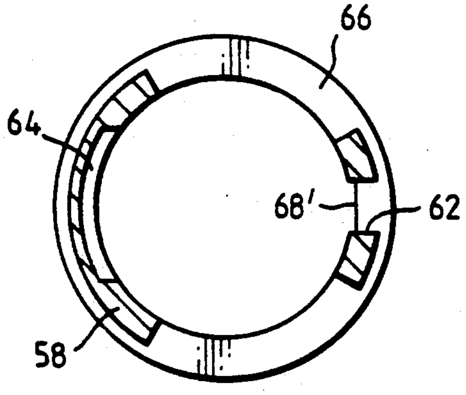
FIG. 11 is a view, in cross section along plane XI—XI, of the valve of FIG. 8.

Referring now to the drawings, there is seen in FIG. 1 a first embodiment of the sprinkler according to the invention, which is of the type having a unidirectional sweep covering a full 360° and comprising a cylinder 2 consisting of an upper part 4 provided at the top with an inwards-projecting shoulder 6, and a lower part 8 tightly attachable to the upper part 4 and having below a reduced portion 10 carrying a pipe thread for connection to a pipe line. Inside the cylinder there is located a central rod 12, rotatably mounted between the reduced portion 10 and the shoulder 6. It is defined in its axial position by a collar 14 which is part of the rod 12, and a shoulder 16 thereon, against which is tightened a sprinkler head 18 carrying a nozzle 20, and screwed onto the threaded end 22 of the rod. As seen so far, the rod 12, additional details of which will be explained further below, can rotate, but cannot move axially, being held in position, with some clearance, between the head 18 and the shoulder 6. For a certain length below the collar 14, the central rod 12 is provided with an octagonal portion 24 the purpose of which will become apparent further below.

Also inside the cylinder 2 there is provided, riding on the central rod 12, a piston-like member 26 which can slide inside the cylinder between an upper position and a lower position, and which divides the cylinder into an upper chamber 28 and a lower chamber 30. The piston member 26 can perform a translatory, reciprocating movement independently of the rod 12, but can rotate about its longitudinal axis only together with the rod, as its upper end is provided with an octagonal hole 32 permitting it to slide along the octagonal portion of the rod, but preventing its rotation relative to, i.e., independently of, the rod 12. This restraint can obviously be realized in different ways, e.g., by the provision of a pin radially projecting from the rod 12, and engaging in a longitudinal slot provided in the piston member 6. It is also understood that the cylinder 2 can be of one piece, with the shoulder 6 being a separate component, detachable for assembly and disassembly of the sprinkler.

Further seen in FIG. 1 are a sliding valve 34, an energy-storing, helical spring 36 and a two-station, flat detent spring 38. These components will be discussed in detail further below.

Following the explanations given so far, it will be appreciated that the operation of the sprinkler according to the invention is based on producing a translatory, reciprocating movement of the piston member 26, on which movement is superposed a rotary movement, which latter is imparted to the central rod 12 and, thus, to the sprinkler head 18 and its nozzle 20.

To produce, in a cylinder, a reciprocating movement of a piston, it is necessary to have the hydraulic fluid—in the case of a sprinkler, water—impact the piston alternatingly on one and the other of its surfaces, which is usually done by means of a valving arrangement that controls the flow of water by covering and uncovering certain port openings through which the water is directed first into one chamber of the cylinder, then into the other chamber. Also required are ports through which the water, displaced from a contracting chamber, can be vented.

In the present rotary sprinkler, the above valving arrangement is realized in the form of the already mentioned sliding valve 34 in conjunction with the helical spring 36 and the detent 38. The various port openings are provided in the central rod 12.

In the following, these components and their cooperation will be discussed in detail.

The central rod 12 is represented in FIGS. 2 to 7. Apart from the details already shown in FIG. 1, the rod 12 is seen to comprise a central supply duct 40, shown to best advantage in FIGS. 5–7, through which duct water is continuously supplied to the sprinkler head 18 and its nozzle 20 (FIG. 1). There is also provided an upper, vertical duct 42 (FIG. 2) extending in the axial direction from a point close to the central zone of the rod, to a point close to the upper end thereof (in fact, for technological reasons, the duct 42 goes right to the end of rod 12 and is plugged up at the very end), and a lower, vertical duct 44, aligned, but not directly communicating, with the upper duct 42, and extending from a point close to the central zone of the rod 12 to a point close to the lower end thereof (again, the last millimeters are plugged up).

Further provided are: a first port, 46, opening onto the surface of the threaded end portion 22 of the rod 12 and communicating with the upper end region of the upper duct 42; a second port 48, opening onto the rod surface and communicating with the lower end region of the upper duct 42; a third port, 50, opening onto the rod surface and communicating with the upper end region of the lower duct 44; a fourth port, 52, opening onto the rod surface and communicating with the lower end region of the lower duct 44, and a fifth and sixth port, 54 and 54', opening onto the rod surface and communicating with the supply duct 40. The function of the control ducts and ports will be discussed further below.

There is also provided a relatively narrow, elongated and axially oriented groove 56 with undercut ends, which serves to accommodate and retain the detent spring 38 (FIG. 1).

The sliding valve 34, slidably seated on the rod 12 in the region of the ports 48,50 and 54,54' is illustrated in FIGS. 8 to 11 and is seen to be a sleeve-like structure consisting of an essentially tubular body 58 in which, in order to reduce resistance to flow, windows 60 have been opened. There is also seen a slot 62 which, as can be seen in the enlarged representation of FIG. 12 accommodates the ramps 70, as well as part of the catches 72 of the detent spring 38. The active part of the sliding valve 34 is a recess 64 of a rectangular outline which in the assembled state of the sprinkler comes to face the ports 48,50,54,54' and, as will be explained in greater detail further below, connects alternatingly port 48 with port 50, and port 50 with ports 54,54'. The tubular body 58 ends in two flanges 66 between which is seated the energy-storing spring 36 the function of which will be discussed further below. Spring 36 is a compression spring of the helical type and is advantageously made of a spring material, e.g., bronze, of a rectangular cross section and with end coils closed. For a reason to become apparent further below, the outside diameter of the spring 36 must be larger than the outside diameter of the valve flanges 66. Part of the flanges 66, in continuation of the slot 62, is slightly recessed, to provide a well-defined "blade" 68 for "riding up" the detent ramps 70 and dropping into the respective catches 72.

Figure 12:
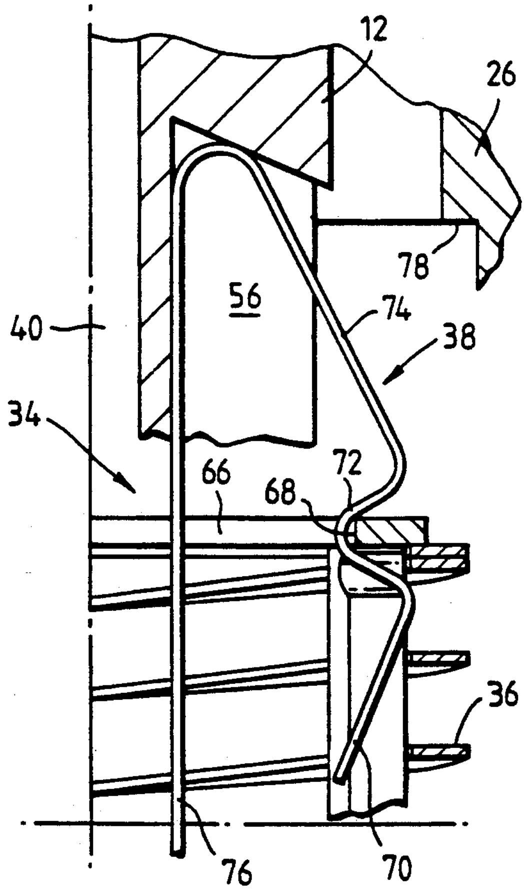
FIG. 12 shows an enlarged detail of the valve and detent assembly.

The relative positions of rod 12, sliding valve 34, detent spring 38 and energy-storage spring 36 are clearly seen in FIG. 12. The detent spring 38 being symmetrical about the vertical center line of FIG. 12, only half the spring 38 has been drawn. It is made of a single strip of stainless spring steel and bent to the shape shown. The base portion 76 touches the bottom of groove 56 and is retained in the groove by the already mentioned undercut at the ends of the latter. The inclined portion 74 and the bent transition between portions 76 and 74 provide the detent force, and the catch 72 can be seen to hold the valve 34 by one of its flanges 66 in one of the detent positions. The inclined ramp 70 helps the blade 68 to enter the catch 72 by depressing it when it "rides up" on it.

In contradistinction to sliding-valve equipped steam engines which have flywheels or, like locomotives, sufficient inertial mass to "tidy them over" the moment their sliding valves are located between their effective positions, the rotary sprinkler which has no such mass would be liable to stop working if its sliding valve were to move slowly. To prevent this from happening, the sliding valve 34 of the present sprinkler is designed as a bi-stable device which at the end of each piston stroke is rapidly flipped over from one to the other stable position. While the stable positions are defined by the two detent catches 72,72' (FIG. 1), the spring 36, the outside diameter of which, as already explained, is larger than that of the valve flanges 66, is intercepted by the respective shoulders 78,78' (FIGS. 1, 12) of the moving piston member 26, which causes spring 36 to be compressed. When compressed beyond a certain point, the restoring force of the spring becomes stronger than the detaining force of the respective detent catch (72 in FIG. 1). which consequently releases the flange blade 68. The re-expanding spring 36 then rapidly flips the valve 34 over until the other blade 68' drops into the other catch 72'.

Figure 13:
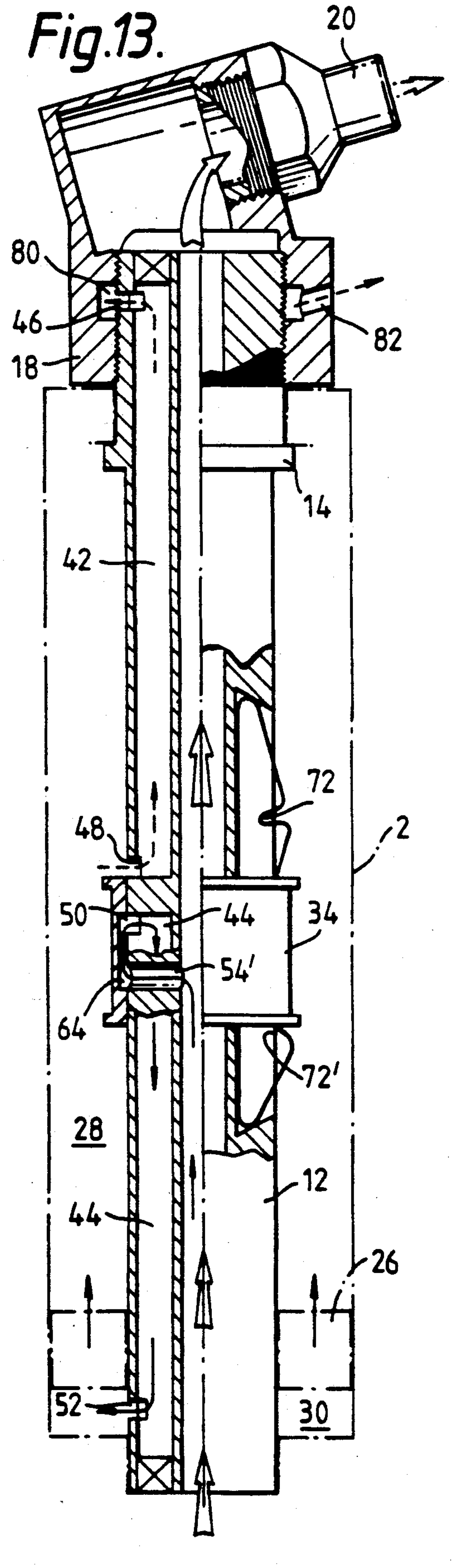
FIG. 13 is a schematic drawing of the rod, in partial cross section along plane XIII—XIII of FIG. 3, illustrating the function of ducts and ports during the upstroke of the piston member.
Figure 14:
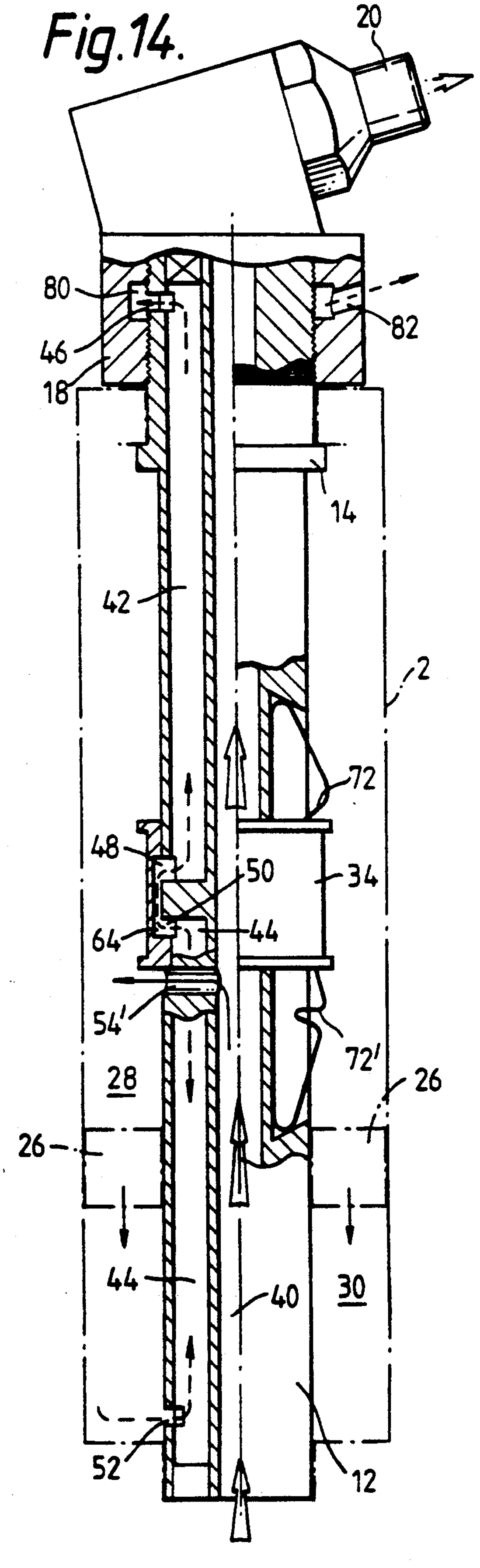
FIG. 14 is a similar drawing, illustrating functions during the downstroke of the piston member.

The function of the various ducts and ports is illustrated in the drawings of FIGS. 13 and 14, in which the cylinder 2 and piston member 26 as well as the sliding valve 34 are schematically simplified. In these representations solid arrow shafts denote piston-moving flows, while dashed shafts denote venting flows. The continuous nozzle-feeding flow is indicated by outlined arrows.

FIG. 13 shows the piston member 26 at the beginning of its upward stroke. The sliding valve 34—shown in simplified form and without spring 36—is in its lower position, detained in detent catch 72'. Most of the water entering the supply duct 40 goes straight to the nozzle 20. A small fraction enters ports 54,54' from duct 40 (only port 54' is shown in a displaced sectional plane—see FIG. 3), exits the same ports at the surface of the rod 12 and is directed by the sliding valve recess 64—which now connects ports 54,54' with port 50 —into port 50, whence it enters duct 44, flows downwards and exits through port 52, thus flowing into the lower cylinder chamber 30 and pushing the piston member 26 upwards. This upward movement obviously reduces the volume of the upper chamber 28, forcing the displaced water volume into port 48, through duct 42 and port 46 into an annular groove 80 in the sprinkler head 18 and through a venting bore 82 into the atmosphere. At the end of the upward stroke the sliding valve 34 is flipped from its lower to its upper position, which initiates the downward stroke, schematically represented in FIG. 14.

As can be seen in FIG. 14, the control recess 64 of the sliding valve now connects ports 50 and 48, in other words, ducts 44 and 42. Water from the supply line now enters the upper chamber 28 through ports 54,54' and pushes the piston member 26 downward, thereby reducing the volume of lower chamber 30. The water volume thus displaced enters port 52, passes through duct 44, via port 50, valve recess 64 and port 48, into duct 42, whence it exits through port 46, enters the annular groove 80 and is vented into the atmosphere through bore 82. At the end of the downward stoke, the slide valve is flipped again and the cycle re starts.

In the aforegoing, a detailed explanation was given as to how water pressure is used to produce a translatory, reciprocating movement of a piston member. In the following, a similarly detailed explanation will be given as to how a unidirectional, rotary movement is produced by, and superposed on, this translatory, reciprocating movement, which rotary movement is then imparted to the rod 12 and the sprinkler head 20.

This superposition is produced by an indexing cam of the barrel type, which is an integral part of the piston member and is tracked by a cam follower in the form of a pin integral with, or fixedly attached to, the cylinder 2.

Figure 15:
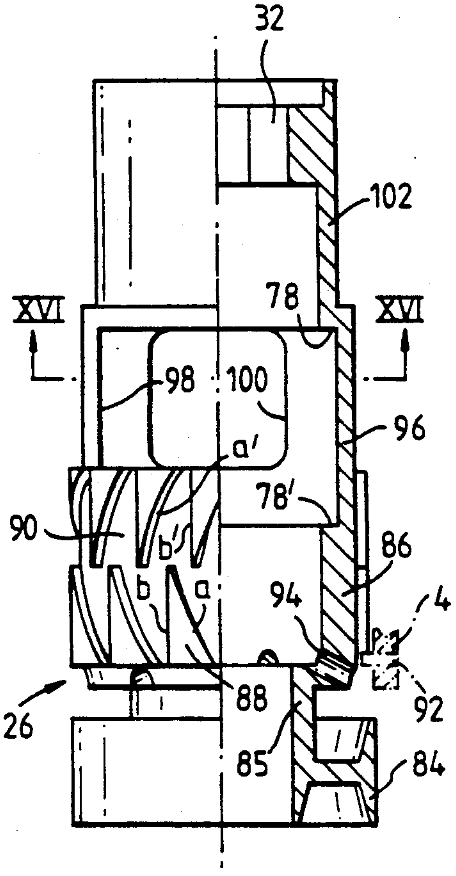
FIG. 15 represents, in partial cross section, the piston member of the rotary sprinkler according to the invention.
Figure 16:
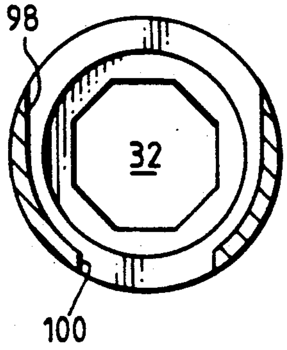
FIG. 16 is a view of the piston member, in cross section along plane XVI—XVI of FIG. 15.

FIG. 15 represents the piston member 26, seen to comprise the piston disk 84 which has a good sliding fit in the lower cylinder part 8 and is connected by a neck portion 85 to the barrel cam 86. The latter is of the per se known indexing type having raised portions constituted by staggered, opposed triangular shapes 88 which define between them tracking recesses 90 in which engages a pin-like cam follower 92 fixedly mounted in, or integral with, the lower cylinder part 8. The active camming surfaces are the respective hypothenuses a and a' of the triangles 88, while the normals b,b' provide a dwell period. As shown in FIG. 15, the piston member 26 has arrived at the end point of its upward stroke, and the cam follower or tracking pin 92 is now located at the lowermost portion of the tracking recesses 90. With the imminent flip-over of the sliding valve 34 (see above), the piston member 26 begins its downstroke which, initially, as long as pin 92 is alongside the lower normal b, is rectilinear. With continuing downward movement of piston member 26, however, the pin 92 makes contact with the upper camming face a', which causes the descending piston member to be imparted a rotary movement in the clockwise sense which continues to the end of the downward stroke, when, after flip-over of the sliding valve 34, the upstroke movement begins again, rectilinearly as long as the pin 92 is adjacent to the upper normal b'. Subsequently, with the pin 92 hitting, or rather being hit by, the lower camming face a, the piston member is again imparted a clockwise rotational step. Due to the coupling between the octagonal portion 24 of the central rod 12 (FIG. 3) and the octagonal hole 32 (FIG. 16) of the piston member, each such rotational step is transmitted to the rod and, obviously, to the sprinkler nozzle 20. It will be appreciated that the tracking recesses 90 can have different shapes, also without "dwelling" stretches b, as long as care is taken to ensure faultless "switching" of the transition between upper and lower cam halves.

The barrel cam portion of the piston member 26 is hollow to accommodate the sliding valve 34 (see FIG. 1) and is provided with a number of peripheral holes 94 through which water flows into the upper chamber 28 (FIG. 1) during the downstroke and from this chamber during the upstroke.

Contiguous with the barrel cam 86 is an intermediate section 96 which has a large opening 98 at the front, to permit the introduction, during assembly, of the sliding valve 34, and a smaller window 100 at the rear to facilitate flow into and out of, the piston member 26.

The last section, 102, of the piston member 26 comprises the octagonal hole whereby the rod 12 is coupled, in rotation, with the piston member 26.

A second embodiment of the invention consists of a so-called "adjustable angular sweep" sprinkler, that is, a sprinkler which, in contradistinction to the sprinkler discussed in the above, does not turn round and round, but can be set to sweep an angle smaller than 360°. Thus a sprinkler mounted near the edge of a lawn needs to cover 180°. Anything less will leave part of the lawn unwatered, while anything over 180° will also water part of the sidewalk. For similar reasons sprinklers on a right-angle corner of a lawn need a 90° sweep, etc.

While the basic principles, i.e., conversion of translatory, reciprocating movement of a piston into rotary movement of the sprinkler nozzle, as well as the means involved in the above are essentially the same with both types of sprinklers, the adjustable angular sweep (AAS) sprinkler must obviously have some additional as well as some modified components.

Figure 17:
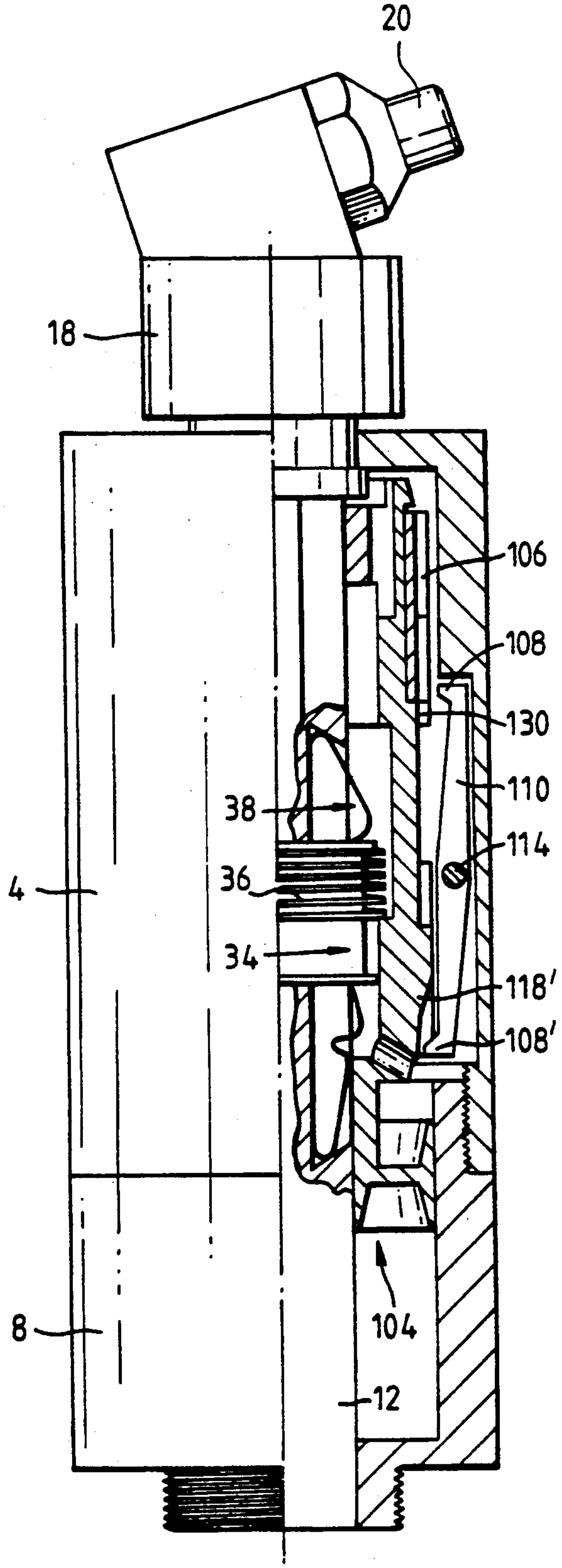
FIG. 17 represents a view, in partial cross section, of a second embodiment of the sprinkler according to the invention.

FIG. 17 shows the assembled AAS-sprinkler, of which the rod assembly, i.e., rod 12, sliding valve 34, helical spring 36 and detent spring 38 as well as sprinkler head 18 and nozzle 20 are completely identical with the same assembly of the previous embodiment and can in fact be regarded as a modular unit. Different are the piston member 104, which carries an additional cam 106, and the two cam followers 108,108'. It is these components that will be discussed in the following.

Figure 18:
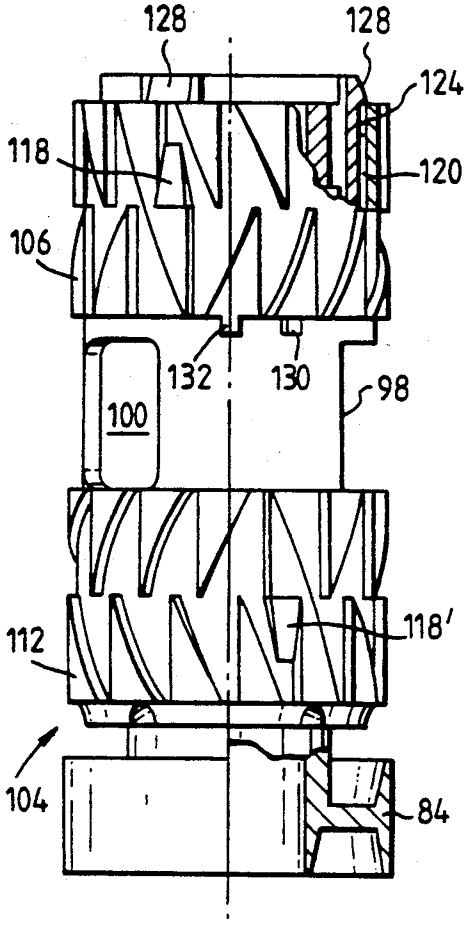
FIG. 18 is a partly cross-sectional view of the piston member of the embodiment of FIG. 17, including the upper barrel cam.

FIG. 18 represents the piston member 104, including the second cam 106. It will be noticed at once that the two cams are, functionally, of opposite "hands", i.e., a cam follower engaging the lower cam, 112, will cause the piston member 104—including, of course, the sprinkler nozzle—to rotate in the clockwise sense, while the upper cam, 106, similarly engaged by a cam follower, will cause the piston member to rotate in the counterclockwise sense. This property is clearly basic to the adjustable angular sweep feature which demands a sweep over a given angular sector, and a return sweep obviously in the opposite sense. It clearly follows that this embodiment of the sprinkler requires two cam followers, one for each cam. Moreover, these two cam followers must act alternatingly, producing a rotational movement in one sense, and for some angular distance, followed by rotation in the opposite sense for the same angular distance.

Before discussing the two barrel cams any further, it is helpful to provide a description of the cam followers 108,108', as their function affects the design of the cams.

Figure 20:
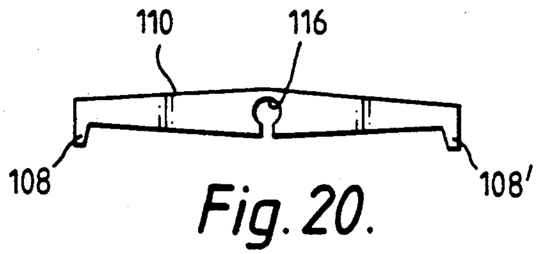
FIG. 20 shows the rocker arm and its two cam followers.
Figure 21:
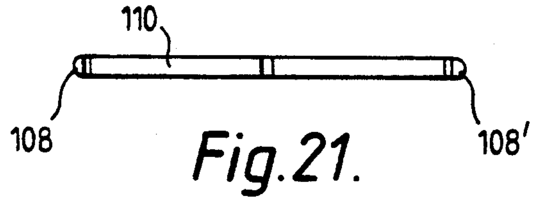

The two cam followers 108,108' (which engage cams 106 and 112, respectively), are located at the respective ends of a rocker arm 110 (FIGS. 20,21) with which they are advantageously integral. The rocker arm is tiltably mounted in the upper cylinder part 4 with the aid of a pivot 114 shown to better advantage in FIG. 19. Pivot 114 has a serrated shaft which fits matched serration (not shown) provided in the rocker-arm bore 116. To provide some flexibility, the bore 116 is slotted. The cylindrical head of the pivot 114 has a slot for a screwdriver, facilitating adjustment for a purpose to be explained further below.

It is now understood that with this rocker-arm design, as one cam follower moves to engage its cam tracks, the other follower will withdraw from his, so that only one of the two followers, 108 or 108' is engaged. i.e., active, at any instant.

Figure 22:
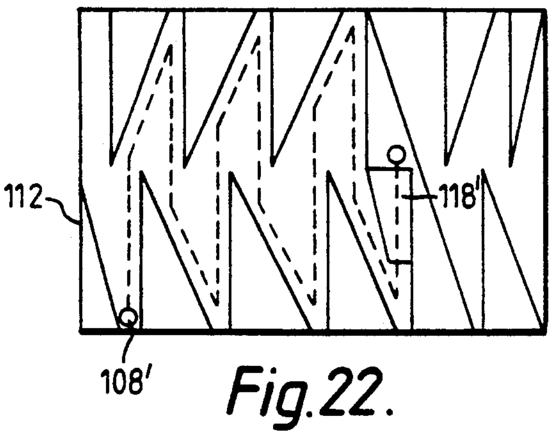
FIG. 22 is a schematic representation of the upper cam of FIG. 18.
Figure 23:
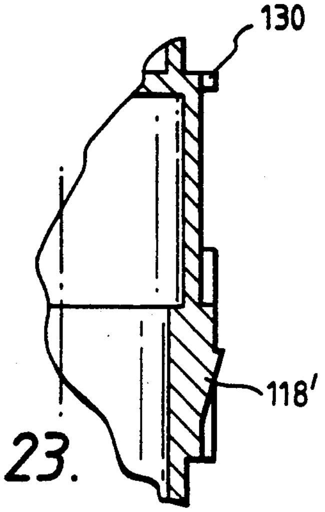
FIG. 23 is a cross-sectional view of the ramp of the lower barrel cam.

To effect this alternating engagement and disengagement, there is provided, both in cam 112 and cam 106, a ramp 118,118', clearly seen in FIG. 18 and in the cross-sectional view of FIG. 23. The manner in which this ramp functions becomes clear with the aid of FIG. 22 which is a schematic representation of cam 112. Assuming that it is the lower cam follower 108' which is now engaged and which is located at the lower end of the track at the left side, the path it describes relative to the cam 112 (relative, since it is of course the cam that, together with the piston member 104, reciprocates axially and swivels, in this case, in the clockwise sense) is indicated by the broken line. Clearly, during the entire "travel" of the lower cam follower 108' the upper cam follower 108 must be disengaged from the tracking surfaces of the upper barrel cam 106. As now, at the end of its "path", the cam follower 108' ascends the ramp 118', the rocker arm 110 (FIG. 17) begins to tilt and to introduce the upper cam follower 108 into the camming tracks of the upper cam 106 until the lower follower 108' is fully disengaged and the upper follower 108, fully engaged, at which moment the piston member 104 begins to rotate in the counterclockwise sense. The angular extent of the sprinkler's sweep, i.e., the angle of the sector watered, is determined by the angular distance between the ramps 118, 118'.

Figure 24:
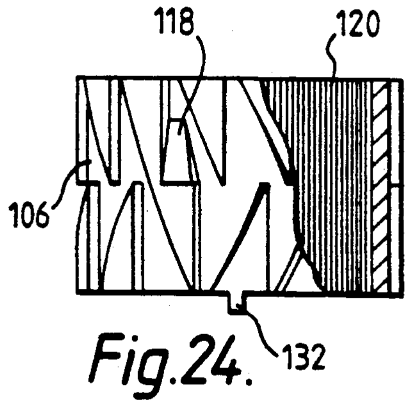
FIG. 24 is a partial cross section of the upper cam.
Figure 25:
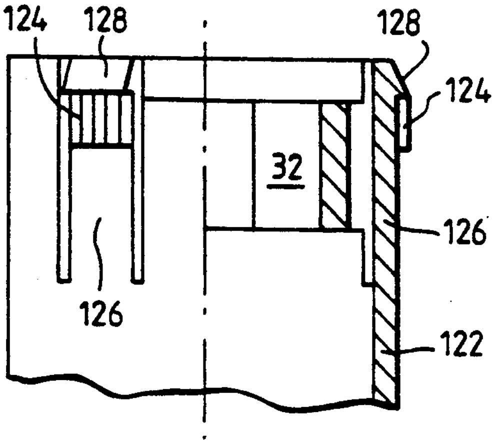
FIG. 25 represents a partial cross section of the upper part of the piston member of the embodiment of FIG. 17.

Given the declared object of this embodiment, namely an adjustable angular sweep sprinkler, it is obvious that provision must be made for the above angular distance between the sweep-reversing ramps 118,118' to be changed at will. This is made possible by making the upper barrel cam 106 rotatable relative to the piston member 104 (of which, it will be remembered, the lower cam 112 is an integral part). To this end, the upper cam 106 is given the form of a sleeve with internal, axially directed serrations 120, as seen in FIG. 24. The uppermost part 122 of the piston member (FIG. 25) on which cam 106 is mounted, is provided with three distinct surfaces bearing counterserrations 124 which are located on three flexible tongues 126. The upper ends of these tongues carry nose-like catches 128 (see also FIG. 18) which, upon assembly, snap over the upper edge of the cam 106 and retain it in its proper axial positions. The counterserrations 124 that match the serrations 120 thus constitute the mechanical coupling between the piston member 104 (via its part 122) and the upper cam 106. However, by application of a reasonable tangential force, the retaining force of the three spring-loaded counterserration spots 124 can be overcome and cam 106 can be swiveled relative to the piston member 104, i.e., relative to the lower cam 112, a capability required, it will be remembered, to alter the angular distance between ramps 118, 118' in order to set the angle of sweep of the sprinkler. Now, it would obviously not do to have to disassemble the sprinkler to set the sweep. All that is needed is to make sure that the upper cam follower, 108, is engaged in the upper cam tracks by using a screwdriver of suitable size and trying to turn the pivot 114 (FIG. 19) in the counterclockwise sense. If the upper cam follower is lifted, it will be brought down into the track by the screwdriver. If it is already engaged, resistance will be felt. Then, by manually turning the sprinkler head, the angular distance between the two ramps 118, 118' can be set, since the upper cam follower, 108, now located in the tracking grooves of the upper cam 106, will not permit the latter to turn, while turning the sprinkler head 18 will also turn the central rod 12 which, through its octagonal portion 24, is rotationally coupled to the piston member 104. Rotation of the latter, while upper cam 106 is held stationary by the upper cam follower 108, will obviously alter the relative angular positions of the two cams 106 and 112 and, thus, of the two sweep-controlling ramps 118,118'.

Figure 19:
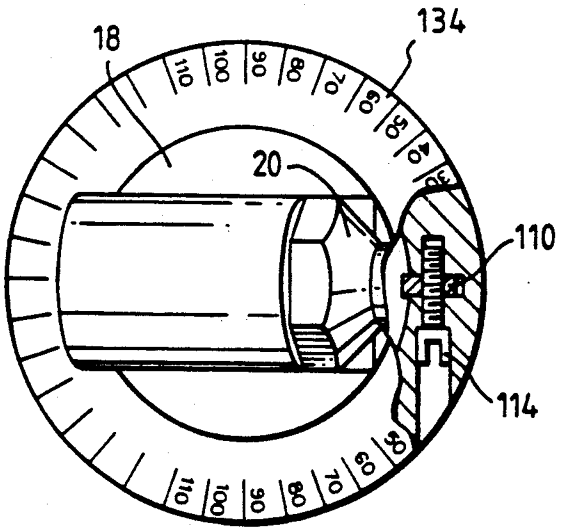
FIG. 19 is a top view, in partial cross section, of the sprinkler of FIG. 17.

A first step in setting the sweep angle is to "zero" the sprinkler. For this purpose there are provided two stops one lower stop, 130, which is an integral part of the piston member 104 (FIGS. 18,23), and one upper stop, 132, an integral part of the upper barrel cam, 106. "Zeroing" is performed by turning the sprinkler head 18, using the above-described procedure, until the two stops 130,132 meet. From this zero position the desired sweep angle is then set, either by trial and error, or by making use of a scale 134 below the sprinkler head 18 (FIG. 19).

Figure 26:
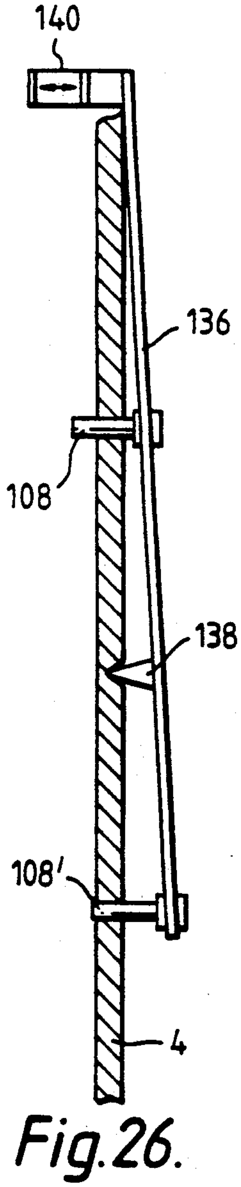
FIG. 26 represents another way of realizing the alternating engagement and disengagement of the cam followers of the embodiment of FIG. 17.

The engaging and disengaging motion of the cam followers 108,108' effected in the above embodiment by the respective ramps 118,118', can be realized also by other means. A first such arrangement schematically shown in FIG. 26 has a rocker arm pivotable about a knife-edge type bearing. The arm is linked to the two cam followers 108,108', and, when actuated at its end portion 140 by an adjustable-dwell cam (not shown), switches their positions.

Figure 27:
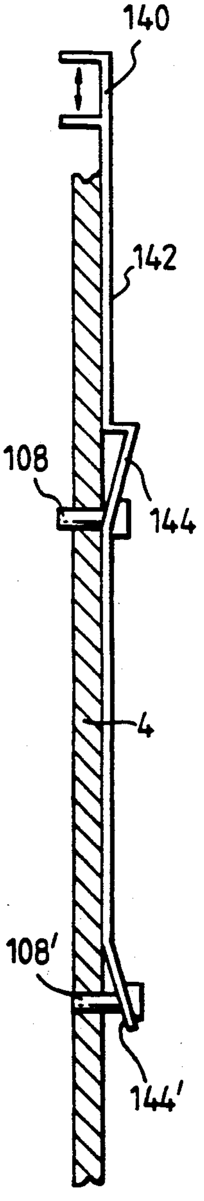
FIG. 27 illustrates yet another solution for the above purpose.

Another arrangement (FIG. 27) has a sliding arm 142 also actuated by an adjustable-dwell cam which produces a reciprocating, linear movement of the arm 142. Moving together with the arm are inclined planes 144,144' with their slopes in opposite directions. When, after an adjustable dwell period, the arm moves downwards, the incline 144 will disengage cam follower 108, while incline 144' will engage cam follower 108'.

Figure 29:
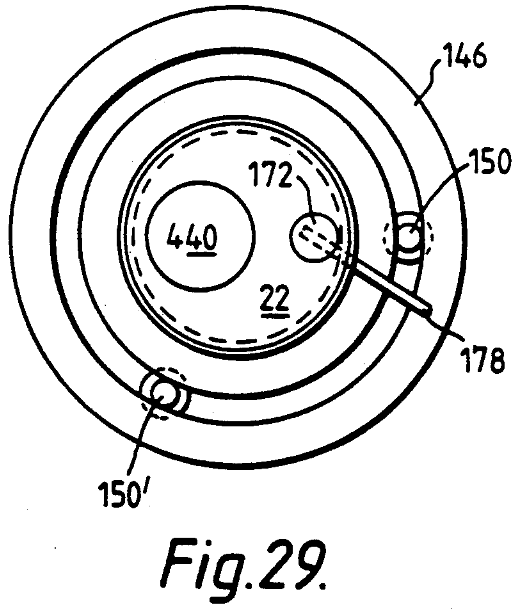
FIG. 29 represents a top view of the above embodiment.
Figure 28:
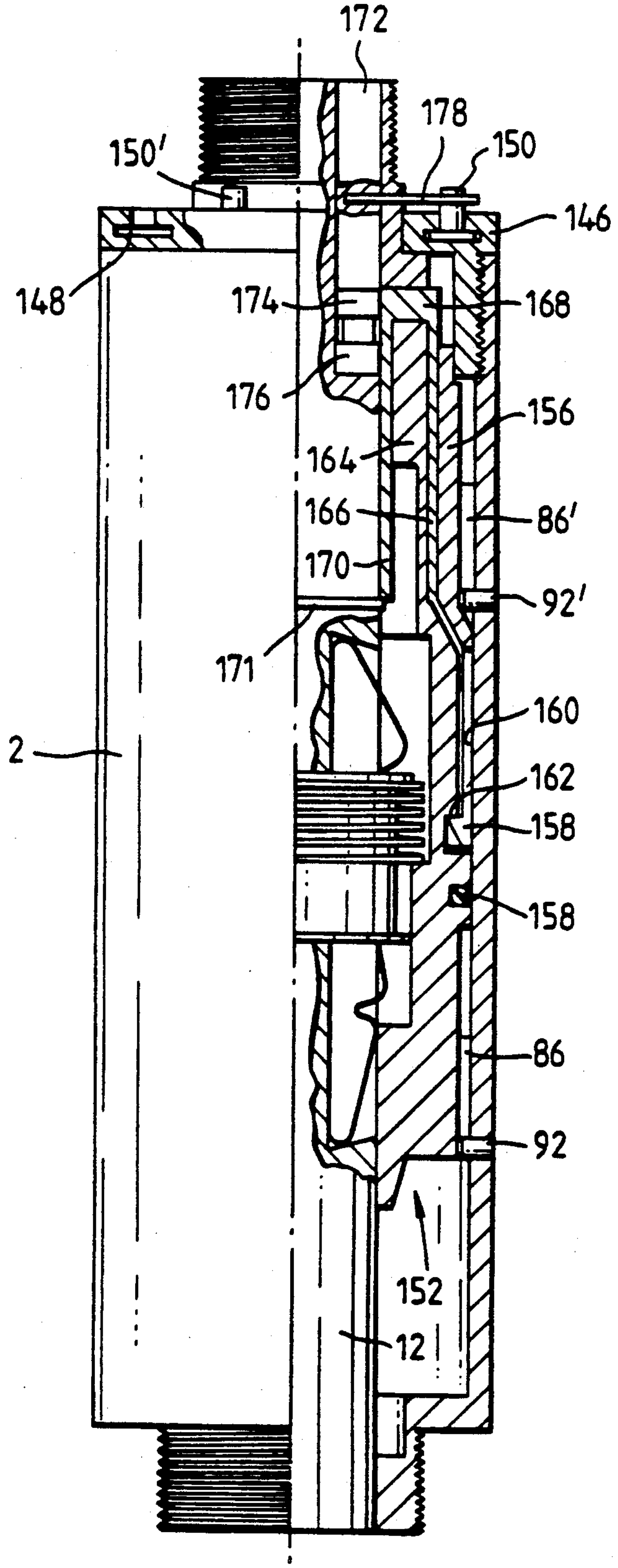
FIG. 28 is a view, in partial cross section, of yet another embodiment of the rotary sprinkler according to the invention.

In yet another embodiment (FIGS. 28,29) the serration coupling between the piston member and the upper cam (104 and 106 in the previous embodiment) has been replaced by a friction coupling.

The cylinder 2 of this embodiment (shown without sprinkler head 18) looks slightly different, being of one piece and having a top part 146 that screws into the upper portion of the cylinder 2. This top part 146 is provided with a peripheral T-slot 148 in which ride two stop pins, 150,150'. the purpose of which will be explained further below.

The piston member 152 is provided with an O-ring 154 for a tight seal and, at its lower portion carries a barrel cam 86, identical in shape to the barrel cam 86 of the first embodiment, shown to best advantage in FIG. 15. This, as will be remembered, is a barrel cam without the disengaging ramp 118 of the second embodiment (FIG. 18) and is engaged by a first, stationary, pin-like cam follower 92 fixedly mounted in, or integral with, the cylinder 2.

There is also provided a second ramp-less cam, 86', which is part of an outer sleeve 156 that, in the axial direction, must move together with the piston member 152, being retained therealong by the catch-like lower edge 158 of the sleeve 156, which edge has been made elastically deformable by the provision of several slots 160 and which engages a peripheral shoulder 162 provided on the piston member 152. The outer sleeve 156 can, however, rotate independently of the piston member 152. The second cam, 86', has its own cam follower, 92', fixedly mounted in the cylinder 2. Like the cams 106,112 in the embodiment of FIG. 18, the two cams 86,86', too, are of opposite "hands" so that when the piston member 152 (together with the outer sleeve 156) carries out its reciprocating movement, the piston member 152 will continuously rotate in one sense, while the sleeve will rotate in the opposite sense.

Interposed between the outer sleeve 156 and the upper, tubular portion 164 of the piston member 152, there is provided a relatively thin intermediate sleeve 166 rotationally coupled to the outer sleeve by a longitudinal key (not shown), but independent of the outer sleeve 156 in the axial direction. The intermediate sleeve 166 is also provided with an inwards directed, annular shoulder 168.

There is further provided an innermost, relatively thin sleeve 170 the inside surface of which freely rotates on the central rod 12. This inner sleeve 170 is rotationally coupled to the tubular portion 164 of the piston member 152 by a longitudinal key (not shown), but independent of this portion in the axial direction. A retaining ring 171, seated in a groove provided in the rod 12 prevents sleeve 70 from sliding down the rod 12 (which, in this embodiment, has no octagonal portion).

Off center, there is arranged in the upper portion of the central rod 12 a spindle 172, rotatably mounted in an appropriately dimensioned, axially directed bore in the rod 12, the lower portion of which bore breaks into the rod surface. On the lower end of the spindle there are provided two axially distanced eccentrics 174,176, the upper eccentric 174 being located opposite the bore of the annular shoulder 168 of the intermediate sleeve 166, and the lower eccentric 176 facing the inside surface of the innermost sleeve 170. The eccentricities of these two eccentrics are slightly offset, angularly, from one another, so that when, by a slight turn of the spindle 172, one eccentric, say the upper one, 174' is pressed against the annular shoulder 168, the lower eccentric, 176, is clear of the surface of sleeve 170, and, of course, vice versa. The slight turn of the spindle 172 in either direction is effected by means of a small rod 178, radially projecting from the spindle in a manner to become apparent presently.

It should be remembered that when (by virtue of the sliding-valve arrangement discussed at length in conjunction with the first embodiment) the piston member 152 performs its reciprocating movement, its cam 86 causes it to rotate in, say, the clockwise sense, while the outer sleeve 156, due to the opposite "hand" of its own cam 86', is caused to rotate in the opposite, in this case, the counterclockwise sense. It should further be remembered that the intermediate sleeve 166 is keyed, in rotation, to the outer sleeve 156, while the innermost sleeve 170 is keyed, in rotation, to the tubular end portion 164 of the piston member 152.

When now the spindle 172 is slightly turned so that the upper eccentric 174 is pressed against the annular shoulder 168 which, it will be remembered, turns in the counterclockwise sense, friction produced by this pressure will cause the entire rod 12 (including, obviously, the sprinkler head 18) to turn in the counterclockwise sense. When spindle 172 is now slightly turned in the opposite sense, the lower eccentric 176 will be forcibly pressed against the inner sleeve (rotating, as mentioned before, in the clockwise sense), while the upper eccentric 174 will break contact with the annular shoulder 168. Friction produced by the pressure of the lower eccentric against the inner sleeve 170 will cause the entire rod 12 to rotate now in the clockwise sense.

The above "slight turn" of the spindle 172 required to change the sense of rotation of the central rod 12 is effected by the small rod 178 (which obviously swivels about the axis of the central rod 12 together with the latter) hitting first the stationary stop 150, which imparts to it that slight turn producing a change of the sense of rotation of the central rod 12, i.e., of the sprinkler. This change in rotational sense will in due course cause the small rod 178 to impact the second stop, 150', to the effect of again producing a reversal of sense of rotation. It is also clear that the angular distance between the two stops determines the angle of sweep of the sprinkler, and that the latter angle is altered by altering the above angular distance. This is done by simply shifting them in the T-slot 148, in which they retain their positions by friction large enough not to be overcome by the impacts of the small rod 178.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. For use in a rotary, adjustable angular sweep sprinkler comprising, inside a stationary housing, slidable piston means adapted to perform a stroke-like, reciprocating, translatory movement and an output member for carrying a sprinkler head, camming apparatus comprising two sets of camming means, each set consisting of a cam moved in reciprocating translation by said piston means and kinematically connected to said output member with, relative to said member, one degree of freedom in translation only, and a cam follower being at least indirectly attached to said housing, said cam followers being adapted to at least intermittently engage the same of their respective sets, whereby, with said piston means performing said translatory movement, each of said cams, whenever engaged by their respective cam followers, is imparted a rotary movement which is transmitted to said output member, wherein the respective camming surfaces of said two cams are so configured that, when engaged by their respective cam followers, the rotary movement thereby imparted to said cams will be clockwise for one of said cams and counterclockwise for the other one of said cams.

2. A camming apparatus arrangement for a rotary sprinkler comprising:

a stationary housing at least the inside wall of which is substantially cylindrical;

two sets of camming means, each set consisting of a cam moved in reciprocating translation by drive means and kinematically linked to an output member with, relative to said output member, one degree of freedom in translation only, said output member, relative to said stationary housing, having one degree of freedom in rotation only, and a cam follower being at least indirectly attached to said housing, said cam follower being adapted to at least intermittently engage the cams of their respective sets, whereby with said drive means producing said reciprocating translatory movement, each of said cams, whenever engaged by their respective cam followers, is imparted a rotary movement which is transmitted to said output member, wherein the respective camming surfaces of said two cams are so configured that, when engaged by their respective cam followers, the rotary movement thereby imparted to said cams will be clockwise for one of said cams and counterclockwise for the other one of said cams.

3. The camming apparatus as claimed in claim 1 or 2, wherein said cams are indexing cams of the barrel type and said cam followers are pin-like, the cylindrical surface of said barrel-type cams being provided with a substantially zig-zagging recess tracked by said pin-like cam followers.

4. The camming apparatus as claimed in claim 1, wherein said indexing cams are of the double-acting type, performing their indexing action both upon the upward stroke and upon the downward stroke of said piston means.

5. The camming apparatus as claimed in claim 1, wherein said indexing means are of the double-acting type, performing their indexing action both upon the upward stroke and upon the downward stroke of said drive means.

6. The camming apparatus as claimed in claim 1 or 2, wherein said cam followers are kinematically linked in such a way that, when one of said cam followers engages its cam, the other one simultaneously disengages from its own cam, or vice-versa.

7. Camming apparatus as claimed in claim 1 or 2, wherein the kinematic link of said two cam followers is a rocker arm pivoted at a point substantially equidistant from said two pin-like cam followers.

8. The camming apparatus as claimed in claim 1 or 2, wherein each of said cams is provided with at least one camming element adapted to interact with the cam follower of its cam to the effect of causing it to disengage therefrom, said element having the shape of a ramp-like projection with its low point at the bottom level of the tracking recesses of said cam, and its high point at least at the surface level of said cam, and wherein one of said cams is angularly settable relative to the other one of said cams to alter the angular distance between said two ramp-like projections, which angular distance determines the extent of the angular sweep of said sprinkler, further comprising means to maintain said angular distance once set.

9. For use in a rotary sprinkler comprising a stationary housing, slidable piston means configured to perform solely by hydraulic action effected by the feed water of said sprinkler a stroke-like, reciprocating, translatory movement, and an output member for carrying a sprinkler head, camming apparatus comprising two sets of camming means for producing a reciprocative rotary movement, each set consisting of a cam moved in reciprocating translation by said piston means and kinematically linked to said output member with, relative to said member, one degree of freedom in translation only, at least one of said two cams being angularly adjustable relative to the other one of said two cams, and a cam follower being at least indirectly attached to said housing, whereby with said piston means performing said reciprocating, translatory movement, said cam, being at least intermittently engaged by said cam follower, is imparted a rotary movement for at least part of its reciprocating movement which rotary movement is transmitted to said output member, further comprising ramp means integral with said cams, adapted to control the intermittent engagement of each of said cams by its respective cam follower.

10. A camming apparatus for a rotary sprinkler comprising:

a stationary housing at least the inside of which is substantially cylindrical;

two set of camming means, each set consisting of a cam moved in reciprocating translation by drive means and kinematically linked to an output member with, relative to said output member, one degree of freedom in translation only, said output member, relative to said stationary housing, having one degree of freedom in rotation only, and a cam follower being at least indirectly attached to said housing, whereby, with said drive means producing said reciprocating translatory movement, said cam, being at least intermittently engaged by said cam follower, is imparted a rotary movement for at least a part of its reciprocating movement, which rotary movement is transmitted to said output member.

11. The camming apparatus as claimed in claim 9 or 10, wherein said cam is an indexing cam of the barrel type and said cam follower is pin-like, the cylindrical surface of said barrel-type cam being provided with a substantially zig-zagging recess tracked by said pin-like cam follower, and wherein said indexing cam is of the double-acting type, performing its indexing action both upon the upward and upon the downward stroke of said piston or drive means.

* * * * *